(12) United States Patent
Meimes et al.

(10) Patent No.: US 8,165,940 B2
(45) Date of Patent: Apr. 24, 2012

(54) NON-CREDIT ACCOUNT CREDIT RATING

(75) Inventors: Andrew Meimes, San Francisco, CA (US); Chris Britt, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 84 days.

(21) Appl. No.: 12/023,249

(22) Filed: Jan. 31, 2008

(65) Prior Publication Data

US 2009/0198612 A1 Aug. 6, 2009

(51) Int. Cl.
*G06Q 40/00* (2006.01)
(52) U.S. Cl. ........................................... 705/35; 705/28
(58) Field of Classification Search ..................... 705/35
See application file for complete search history.

(56) References Cited

U.S. PATENT DOCUMENTS

| | | | |
|---|---|---|---|
| 2002/0194122 A1 | 12/2002 | Knox et al. | |
| 2004/0078328 A1* | 4/2004 | Talbert et al. | 705/40 |
| 2006/0106695 A1* | 5/2006 | Carlson et al. | 705/35 |
| 2007/0156576 A1 | 7/2007 | Imrey et al. | |
| 2008/0021826 A1* | 1/2008 | Brake et al. | 705/41 |
| 2008/0255897 A1* | 10/2008 | Megdal et al. | 705/7 |
| 2009/0099965 A1* | 4/2009 | Grant, IV | 705/41 |
| 2009/0171838 A1* | 7/2009 | Liu et al. | 705/40 |

FOREIGN PATENT DOCUMENTS

| KR | 10-2001-0094889 A | 11/2001 |
|---|---|---|
| KR | 10-2007-0118456 A | 12/2007 |

OTHER PUBLICATIONS

Doman, Mark and Christainsen, James ; Non-credit public record data for credit decisions : Commercial Lending Review V18 n4 pp. 38 Jul. 2003. ISSN: 0886-8204 JRNL Code : CLV.*
PCT Search Report, International Application No. PCT/US2009/032216, dated Aug. 31, 2009.

* cited by examiner

*Primary Examiner* — Ella Colbert
*Assistant Examiner* — John A Anderson
(74) *Attorney, Agent, or Firm* — Walter G. Hanchuk; Chadbourne & Parke LLP

(57) ABSTRACT

A consumer's credit rating is derived from non-credit transactions on an account. Each transaction was a purchase by the consumer from a merchant using a pre-paid card. The derived consumer's credit rating can use a total of all of the transactions, totals for each merchant and/or for categories thereof. Here, the account is issued by an issuer to the consumer. Each merchant submits each non-credit transaction to an acquirer for processing by a transaction handler who requests the issuer to obtain payment for the transaction from the account. The issuer forwards the payment to the transaction handler who forwards the payment to the acquirer to pay the merchant for the purchase of the transaction. The derived credit rating can also consider prior credit ratings based upon prior credit transactions.

27 Claims, 4 Drawing Sheets

NON-CREDIT ACCOUNT CREDIT RATING

FIELD

Implementations generally relate to a lender's considerations in extending credit to a borrower, and more particularly relate to rating the credit-worthiness of a borrower, and most particularly relates to assessing cashless, non-credit transactions conducted by a borrower to make an adjustment to a borrower's credit worthiness.

BACKGROUND

Consumer transactions with merchants are increasingly being made payable on non-credit accounts such as those associated with stored value cards, reloadable cards, pre-paid cards, and debit cards. Non-credit accounts are those that utilize funds that the consumer has previously deposited into the non-credit account for payment or withdrawal purposes. The use of non-credit accounts are particularly prevalent among an unbanked consumer populous. This populous includes consumers that do not have a conventional relationship with a financial institution such as a banks or a credit union. In such cases, the consumer typically does not have a checking account upon which checks can be drawn by the consumer to make a purchase from a merchant. These unbanked consumers often experience difficulty in engaging in a transaction with a merchant that will not accept cash because the consumer does not have an account with a financial institution from which funds can be transferred for the transaction. Moreover, consumers doing cash-only business with a merchant typically have a poor credit rating in that credit bureaus (e.g.; Experian of Costa Mesa, Calif., TransUnion LLC of Chester, Pa., and Equifax, Inc. of Atlanta, Ga.) look to the credit history of the consumer's past borrowing to derive the consumer's credit worthiness.

One option available to an unbanked consumer is to purchase a reloadable portable consumer device (e.g.; a reloadable pre-paid card) typically offered for sale at a retail store of a merchant. Merchants offering such cards for sale include those operating supermarkets, big box retailers (e.g.; Sears, Walmart), etc. The purchase price of the reloadable pre-paid card is typically an initial service charge plus any funds that the consumer wished to have deposited into an account issued by an issuer that corresponds to the reloadable pre-paid card.

After the consumer pays this purchase price to the merchant, the consumer still cannot use the reloadable pre-paid card to conduct transactions with other merchants. Rather, the consumer must first 'active' the reloadable pre-paid card. To do so, the consumer must provide biographical data to the issuer or agent thereof. These biographical data may include the consumer's name, social security number, residential address, etc. These data may provided, for instance, to the merchant from whom the card was purchased such as for entry at a Point of Service (POS) terminal, for entry by the consumer using a toll-free number associated with the card, or for entry via a user interface at an Internet website accessible to the consumer.

Upon receipt, the issuer or its agent conducts a background check and other processes before activating the card for transactional use. Optionally, the issuer or its agent may subsequently have a 'personalized' replacement reloadable pre-paid card delivered to the consumer at their residential address, where the replacement card is embossed with the consumer's name. Thereafter, the consumer can take their reloadable pre-paid card to a merchant (or financial institution), give the merchant cash, and have the merchant add the cash to the account corresponding to the reloadable pre-paid card. As such, the consumer can re-load money onto the reloadable pre-paid card. Alternatively, or in addition, the consumer can request that each of its debtors make a direct deposit of amounts owed to the account of their reloadable pre-paid card. Examples of the consumer's debtors include an employer, a merchant making a refund of a prior purchase, etc.

The use non-credit accounts toward payment of reoccuring and regularly periodic payment obligations has become more prevalent around the world. For example, an unbanked consumer may provide the account of their reloadable pre-paid card to a merchant to whom the consumer owes a reoccurring payment obligation (e.g.; power, gas, or cable TV company, landlord, periodic insurance premiums, etc.).

Credit scoring agencies, such as credit reporting bureaus and companies in the lending community, use individual credit profiles and credit rating computation algorithms (e.g., Fair, Isaac and Company, Inc. of San Rafeal, Calif. (FICO®)) to derive credit ratings. These derivations, however, when determining a credit score of a consumer do not take into consideration the consistent and timely payment of reoccurring bills made with non-credit accounts. Consequently, a consumer using a non-credit account to make timely and regular payments over an extended period of time will have a credit rating that is unsatisfactory because it will not reflect the likely probability that the consumer will be able to pay back a loan as evidenced by the consumer's non-credit account transaction history. As a result of having a low credit score, for example, the consumer may be subjected to higher insurance premiums, rejections in housing rental requests, higher interest rates for purchases on credit, and/or a refusal on a loan.

Given the foregoing, it would be an advance in the debt market arts to provide techniques for assessing a consumer's credit risk on factors of the consumer's transaction history with merchants on their non-credit account.

SUMMARY

In one implementation, a computer implemented system derives a credit rating of a consumer by using non-credit transaction data from a plurality of cashless transactions on an account of the consumer. Each such transaction is conducted by the consumer with a merchant for a purchase of a payment amount using a pre-paid reloadable card representing the account. The non-credit transaction data can include, for the consumer, a total of all of the payment amounts for all of the transactions, totals for each merchant, and totals for categories of merchants. Optionally, the non-credit transaction data can correspond to one or more of such accounts of the borrower, where each account has at least one transaction with the date thereof within a predetermined time period.

In yet another implementation, a credit rating adjustment method receives a credit rating value associated with a borrower that is generated by a credit reporting bureau. Additional data is received that was not considered by the credit reporting bureau but was derived from a plurality of transactions each characterized by a merchant and the borrower engaging in the transaction for a purchase upon an account. For each such transaction, however, rather than borrowing money for the purchase, the borrower offers to the merchant a payment amount for the transaction using a pre-paid card that corresponds to the account. These additional data may include a total of all of the payment amounts for all of the transactions conducted by the borrower with the pre-paid card, totals for each merchants, and/or totals for categories of merchants. A revised credit rating value is derived for the borrower from both the credit rating value and the additional data. Optionally, the additional data can be data corresponding to one or more of the accounts of the borrower, where each account has at least one transaction with the date thereof within a predetermined time period.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Processing of a payment between a consumer and a merchant for a transaction is addressed in various exemplary implementations described for a payment processing system. Within the payment processing system, a transaction handler processes a transaction characterized by a consumer and a merchant engaging in the transaction upon an account that has been issued to the consumer by an issuer. The account will preferably be a non-credit account such as a prepaid account, a debit account, a deposit account, a flexible spending account, a health savings account, or combinations thereof. The merchant may be a retailer, a wholesaler, a reseller, a manufacturer, or a distributor, for example. As used herein, if a merchant is engaged in making a purchase in a transaction from another merchant, then the purchasing merchant will be deemed to be the consumer and the selling merchant will be deemed to be the merchant for that transaction.

Figure 1:
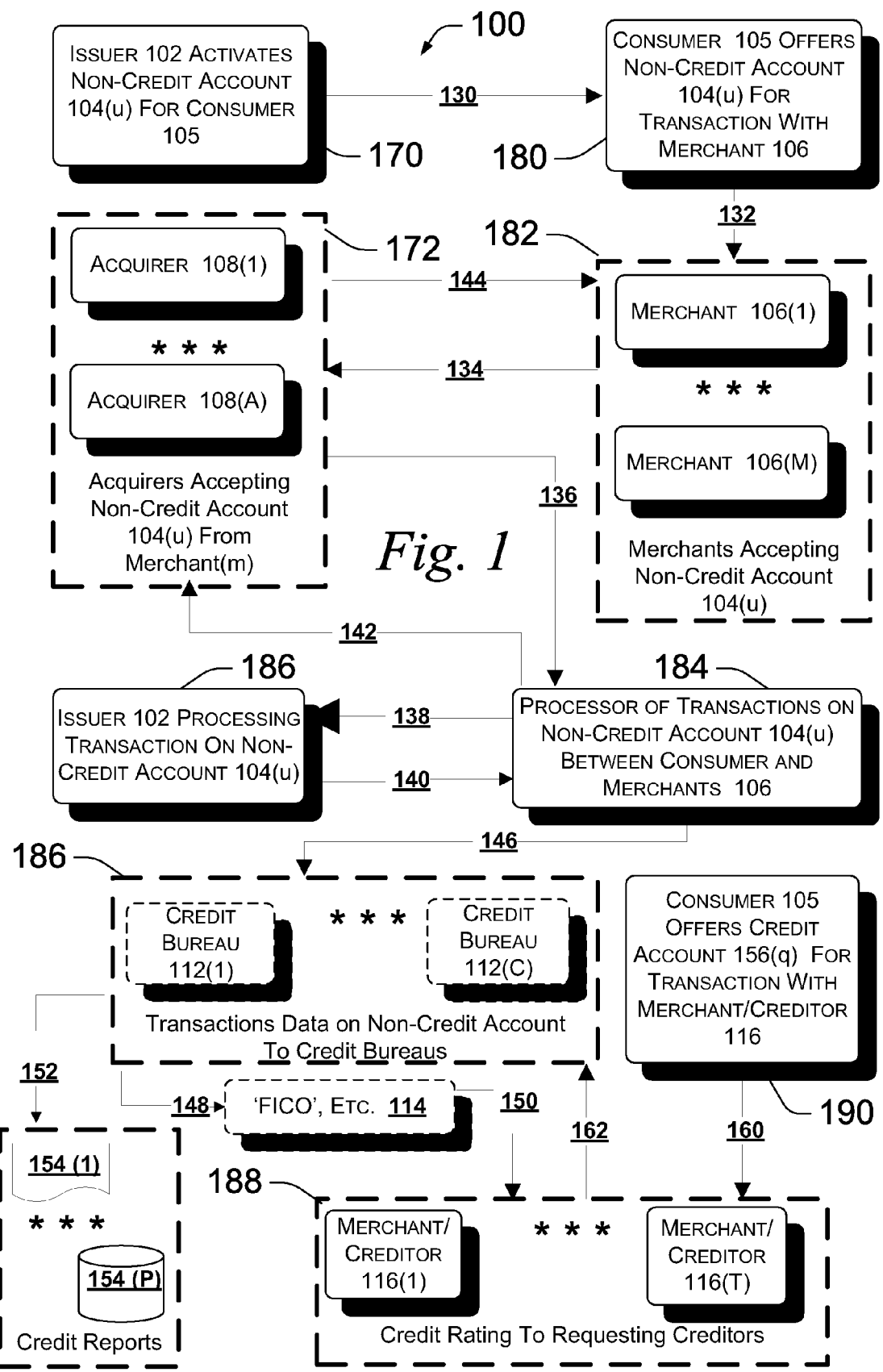
FIG. 1 illustrates a flow chart of an exemplary method for deriving a credit rating for a consumer using, at least in part, the transaction history of the consumer's non-credit account.

Referring to FIG. 1, a flowchart depicts an exemplary method 100. Method 100 begins a box 170 at which an issuer 102 activates a non-credit account 104(u) for a consumer 105. As used herein, a lower case letter seen parenthetically in a reference numeral on a Figure is intended to mean a single instance, where the instance can be from an instance represented by the number one (1) through an instance represented by the upper case (capital) letter. Thus, the non-credit account 104(u) is intended to mean one instance of one (1) non-credit account. That is, the non-credit account 104(u) means any one instance of non-credit account 104(1) through non-credit account 104(U).

Method 100 moves from Box 170 to Box 180 at which the Consumer 105 offers the non-credit account 104(u) for a transaction with a Merchant 106 that is selected as seen in Box 182 from Merchant 106(1) through Merchant 106(M), or particularly merchant 106(m). In particular, merchant 106(m) will accept a reloadable pre-paid card associated with a non-credit account, and particularly non-credit account 104(u).

At process flow 134, merchant 106(m) sends the information from the transaction to the acquirer 108(a). Thereafter, acquirer 108(a) sends the transaction data through process flow 136 to Box 184 for receipt by a processor of transactions on non-credit account 104(u) between the Consumer 105 and the Merchant 106(m). Process flow 138 moves in method 100 to Box 186 at which the processor of the transactions sends to the Issuer 102 information about the transaction so that funds can be withdrawn from the non-credit account 104(u), as well as seeking the approval/authorization of the Issuer 102 for the withdrawal of such funds on such transaction. Thereafter, process flow 140 shows that the Issuer 102 informs the Transaction Processor at Box 184 as to the approval/authorization of the transaction. Thereafter, the Transaction Processor at Box 184, through Process Flow 142 from Box 184 to Box 172, notifies the acquirer 108(a) that there has been approval by the Issuer 102 of the funds to be withdrawn from the non-credit account 104(u). Thereafter, through Process Flow 144, the Merchant 106(m) is paid the funds for the transaction through the acquirer 108(a).

Periodically or with each such transaction, the Transaction Processor at Box 184 will notify the Credit Bureau about those transactions that have taken place on non-credit account 104(u) as shown in Process Flow 146 extending from Box 184 to Box 186. The Credit Bureaus are seen as Credit Bureau 112(1) through Credit Bureau 112(C). One or more such Credit Bureaus 112 may compute a credit rating, as shown at Process Flow 148, by using the transaction data on non-credit account. The computed or otherwise derived credit rating may be deemed to be a modified FICO credit rating, a revised, updated, enhanced, modified and/or newly derived credit rating for each consumer for which non-credit transactions are reported through the notification of Process Flow 146.

After the computation or derivation of the credit rating using transaction data on non-credit accounts, Process Flow 150 shows that the new or revised credit rating can be communicated to Merchants/Creditors 116 for the production of a Credit Report 154(p) or variety thereof. A variety of Credit Reports 154 can be produced by Credit Bureaus 112, either individually or collectively, or each such Credit Bureaus 112 can produce a Credit Report 154(p) as seen in FIG. 1. Credit Report 154(p) can be data, a hard copy, or a soft copy of a report of such credit data. Here, each such Credit Report 154(p) can be a report on credit data as well as on data gathered from non-credit account transactions, as well as data gathered from both credit and non-credit account transactions.

Once each Merchant/Creditor 116(p) has an opportunity to review a Consumer 105's credit rating as a function of the non-credit account usages in various cashless non-credit transactions with various Merchants 104, Merchant/Creditor 116(t) may decide to extend credit or otherwise make a loan to Consumer 105 at least in part on the basis of the Consumer 105's non-credit transactions. When such credit is offered, as shown by Process Flow 160, Consumer 105 will be offered a newly issued credit account 156(q) for a transaction with Merchant/Creditor 116(t). In this case, an issuer must issue to Consumer 105 the Credit Account 156(q) for such credit-based transactions with Merchant/Creditor 116(t).

The history of credit-based transactions by the Consumer 105 using the Credit Account 156(q) with any of the Merchant/Creditor 116 can be reported through Process Flow 162 to one or more Credit Bureaus 112. Each Credit Bureau 112(c) may use this history, in conjunction with the aforementioned accumulated non-credit transaction history, to make a further credit rating adjustment. To do so, the Credit Bureau 112(c) receiving at least one credit rating value associated with the Consumer 105 who will then be deemed to be a borrower to may receive a loan. The at least one credit rating value will be generated, for instance, by the Credit Bureau 112(c). Additional data will also be received by the Credit Bureau 112(c) that was not previously considered by the Credit Bureau 112(c) in determining the at least one credit rating but rather was derived from a plurality of non-credit transactions each characterized by a merchant 106(m) and the Consumer 105 engaging in the transaction for a purchase upon an account, the Consumer 105 offering to the merchant 106(m) a payment amount for the transaction using a portable consumer transaction device (e.g.; a debit or pre-paid card) that corresponds to the account of the Consumer 105. The Consumer 105 may have one or more such cards. Here the additional data may be a total of all of the payment amounts for all of the transactions conducted by the Consumer 105. Then, using the at least one credit rating and the additional data, a revised credit rating value will be derived for the Consumer 105. The additional data may be, alternatively or in combination, data corresponding to one or more accounts of the Consumer 105 where each account has at least one transaction with the date thereof within a predetermined time period. The additional data for the borrower may also be a total of all of the payment amounts for all of the transactions for each said merchant. The additional data may be, alternatively or in combination, data corresponding to a total of all of the payment amounts for each category of merchant. As such, a total for all hardware stores, a total for all landlords, a total for all utility companies, etc. may be used as the additional data.

Figure 2:
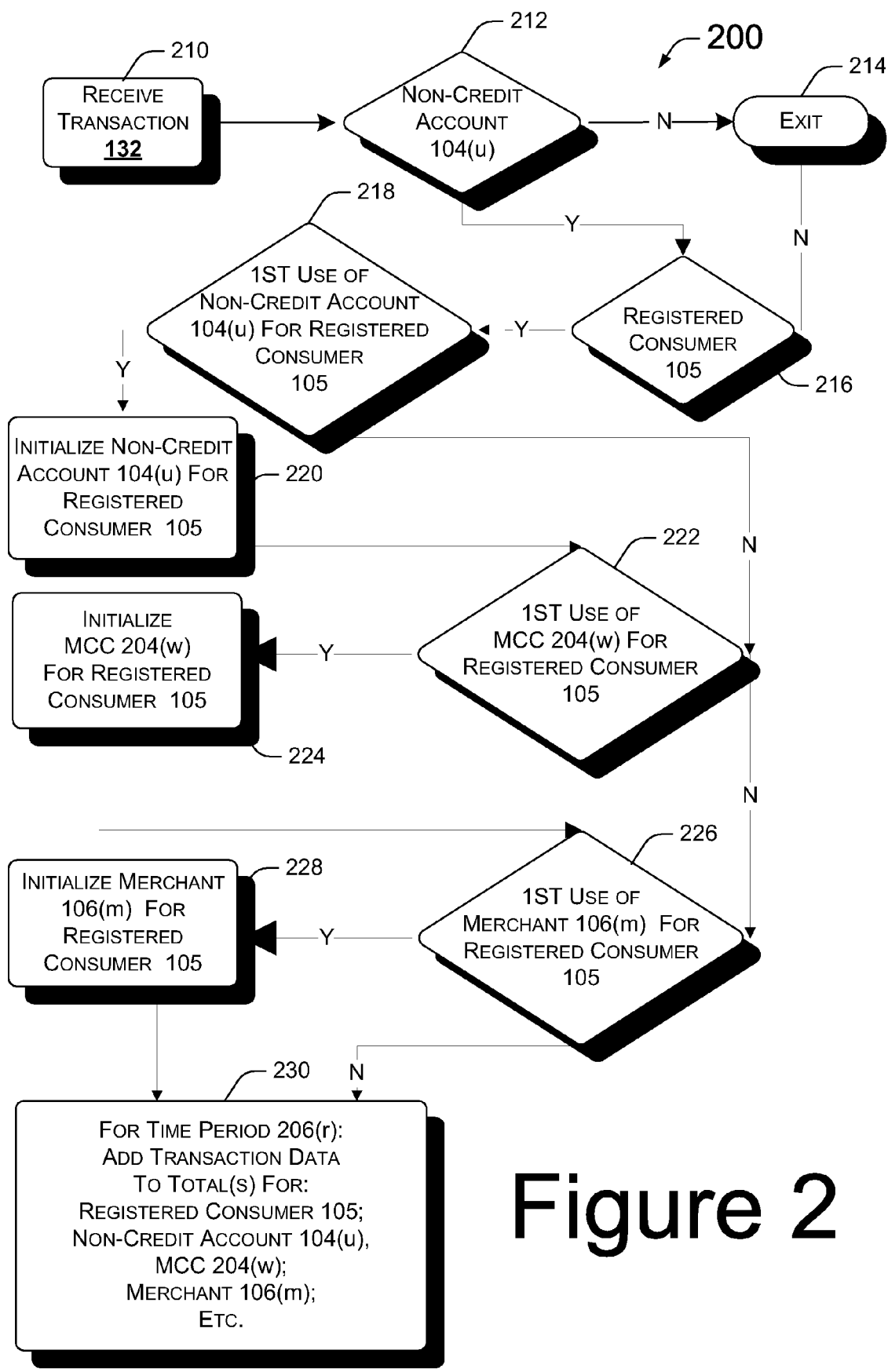
FIG. 2 illustrates a flow chart of an exemplary process for accumulating data relating to a consumer's transaction history of the consumer's non-credit account.

FIG. 2 shows a flow chart depicting an exemplary Method 200 which begins at Box 210 where a transaction on a non-credit account is received from a consumer by a merchant. Box 210 can correspond, for example to Process Flow 132 seen in FIG. 1. At Step 212, a query is made as to whether the transaction involves a Non-Credit Account 104(u). If not, then Method 200 terminates at Box 214. If the transaction does involve a Non-Credit Account 104(u), then Method 200 moves to Step 216 at which another query is made as to whether the Consumer 105 has registered for with a "Non-Credit Account Credit Rating Program". To do so, for instance, the consumer will so indicate to the merchant from whom the card was purchased such as at a Point of Service (POS) terminal, by a toll-free number associated with the card, or via a user interface at an Internet website accessible to the consumer. If no such registration has been made, then Method 200 terminates at Step 214. Otherwise, Method 200 moves to Step 218.

At Step 218, a query is made as to whether this is the first use of a Non-Credit Account 104(u) by the Registered Consumer 105. If this is not the first use by the Registered Consumer 105, then Method 200 moves to Step 222. If, however, this is the first use of the Non-Credit Account 104(u) by the Registered Consumer 105, then the Non-Credit Account 104(u) is initialized at Step 220.

Thereafter, after Step 220, Method 200 moves to Step 222 where a query is made as to whether this is the first use of a Merchant Commodity Code 204(w) by the Registered Consumer 105. Stated otherwise, if this is the first transaction that a consumer conducted with a particular type of merchant, as evidenced by a unique Merchant Commodity Code (MCC) seen in the transaction data, then Method 200 moves to Step 224 at which MCC 204(w) is initialized for that Registered Consumer 105.

Method 200 moves to Step 226 from Step 224 or 222. At Step 226, a query is made as to whether this is the first time the Registered Consumer 105 has made a purchase from Merchant 106(m). If so, then Method 200 moves to Step 228 at which that Merchant 106(m) is initialized for that Registered Consumer 105. Otherwise, Method 200 moves to Step 230.

At Step 230, the transaction data from the Non-Credit Account Transaction is added to various totals for the Registered Consumer 105. For instance, a total may be kept for the Non-Credit Account 104(u), for each MCC 204(w), and/or for each Merchant 106(m). As such, Step 230 stores data in a database that can be used by credit bureaus and/or lenders to recognize the Registered Consumer 105 for the Non-Credit Account Transactions that have been made using the Non-Credit Account 104(u). The totals reflected by the accumulation from transactions over time, and specifically for each Time Period 206(r), may demonstrate that the Registered Consumer 105 is timely and consistent in paying merchants of a particular category, and in paying specific merchants. These totals will preferably include the total transactions in monetary amounts that have been paid using the Non-Credit Account 104(u). Of course, the numeral quantity of such transactions can also be stored for each consumer and for each card used by the consumer. Thus, a consumer can be acknowledged for each use of more than one (1) pre-paid reloadable account each corresponding to a card offered by the consumer to a merchant for a cashless transaction.

Figure 3:
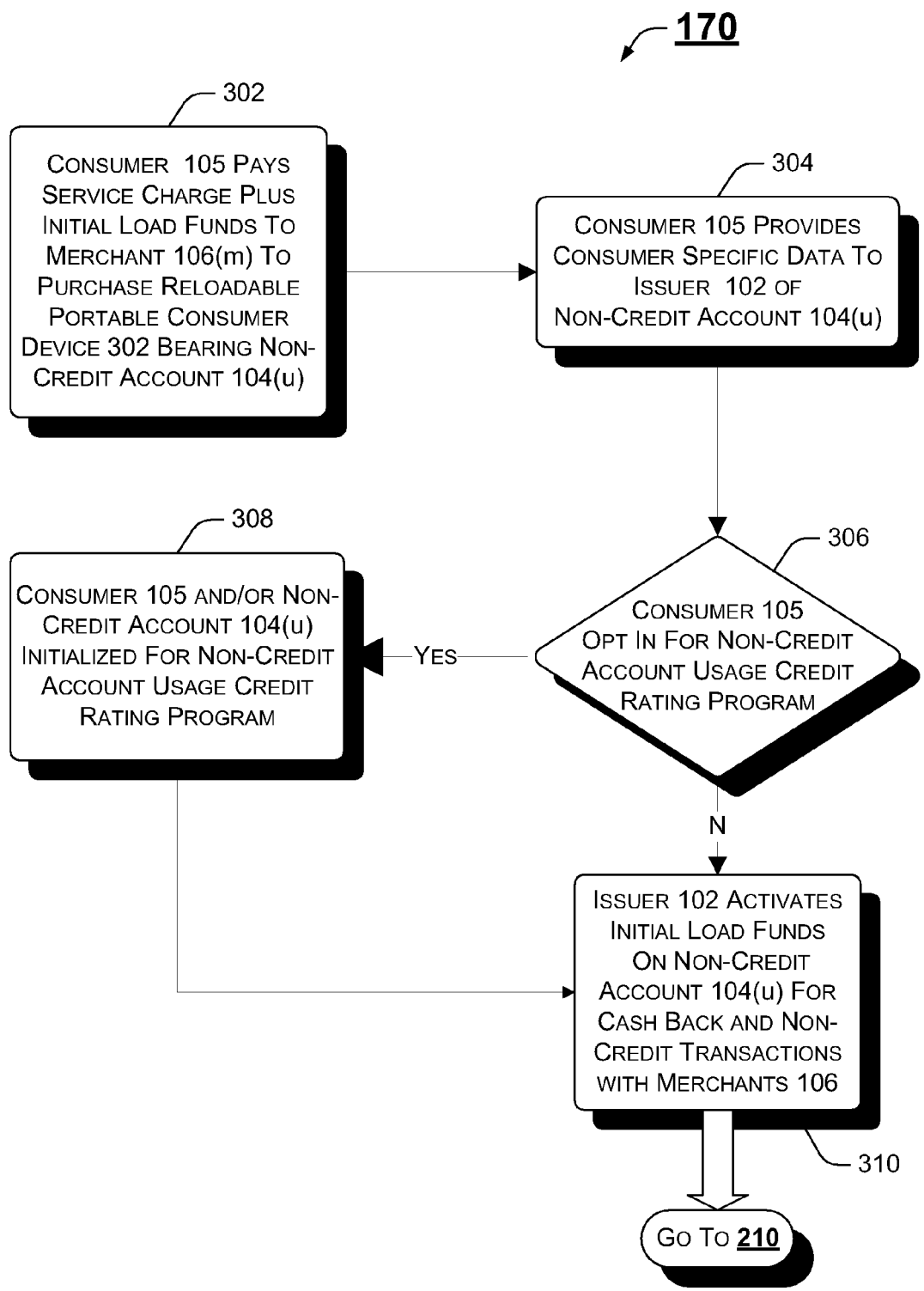
FIG. 3 illustrates a flow chart of an exemplary method by which a consumer can acquire and activate a pre-paid reloadable card to conduct cashless, non-credit transactions on an account corresponding to the card.

FIG. 3 shows an exemplary method 170 corresponding to Box 170 seen in FIG. 1. In the exemplary method 170, a consumer obtains and activates a pre-paid card prior to its use. Box 302 indicates that a Consumer 105 makes a payment of a service charge plus an initial amount of funds to a Merchant 106(m). This payment is made to purchase and load the initial amount of funds on to a Re-loadable Portable Consumer Device 302. Portable Consumer Device 302 corresponds to a Non-Credit Account 104(u). As such, the Re-loadable Portable Consumer Device 302 can be a pre-paid or debt card that can be used to conduct cashless transactions with a Merchant 106(m). Also, the Re-loadable Portable Consumer Device 302 can be used at an Automatic Teller Machine (ATM) machine to withdraw cash from the Non-Credit Account 104(u).

Method 170 moves to Box 304 at which the consumer provides consumer specific data to an Issuer 102 of the Non-Credit Account 104(u). As such, Box 304 may be seen to correspond to Box 170 in FIG. 1 in order to 'active' the reloadable pre-paid card. To do so, the Consumer 105 must provide biographical data to the issuer 102 or agent thereof. These biographical data may include the Consumer 105's name, social security number, residential address, etc. These data may provided, for instance, to the merchant 106(m) from whom the card was purchased such as at a Point of Service (POS) terminal, by a toll-free number associated with the card, or via a user interface at an Internet website accessible to the Consumer 105.

Upon receipt, the issuer 102 or its agent conducts a background check and other processes before activating the card for transactional use. Optionally, the issuer 102 or its agent may subsequently have another reloadable pre-paid card delivered to the Consumer 105 at their residential address where the replacement card bears the name of the Consumer 105 (e.g.; a 'personalized' reloadable pre-paid card). Thereafter, the Consumer 105 can take their reloadable pre-paid card to a merchant 106(m), give the merchant 106(m) cash, and have the cash amount added to the account corresponding to the reloadable pre-paid card (e.g.; thereby re-loading money onto the reloadable pre-paid card). Alternatively, or in addition, the Consumer 105 can also request that each of its debtors (e.g.; employer, merchant refunds, etc.) make a direct deposit of amounts owed to an account identifier number of their reloadable pre-paid card.

At Step 306, a query is made as to whether Consumer 105 will opt in for the Non-Credit Account Usage Credit Rating Program as described herein. If not, the Process 126 moves to Box 310 at which the issuer 102 activates the card. Otherwise, exemplary method 170 of FIG. 3 moves to Box 308 at which an initialization is made for the Consumer 105 and/or for one or more Non-Credit Accounts 104(u) thereof. Thereafter, the Non-Credit Account Usage Credit Rating Program for which the Consumer 105 has registered affirmatively at Box 306 is implemented for the Consumer 105 for one or more such Non-Credit Accounts 104. As such, the Consumer 105 can have multiple pre-paid cards and get recognition towards credit worthiness for each non-credit transaction on each pre-paid card. In sum, the Consumer 105 may thereby realize a change of the Consumer 105's credit rating on the basis payments, on the basis of timely payments to merchants, and on the basis of timely payments to categories of merchants.

At Box 310, as mentioned above, the Issuer 102 actives the initial loaded funds paid by the consumer to the merchant 106(m) onto the Non-Credit Account 104(u). Thereafter, the Consumer 105 can begin to make cash withdraws from ATM machines, as well as conduct cashless non-credit transactions with Merchants 106. Such transactions are seen at Step 210 as seen in FIG. 2.

A variety of Credit Reports 154 can be produced by Credit Bureaus 112, either individually or collectively, or each such Credit Board is seen in FIG. 1 as Credit Report 154(p). A Credit Report can be both data or a hard copy or a soft copy of report of such credit data. Here, each such Credit Report 154(p) can be a combination of credit data and gathered from Non-Credit Account Transactions as well as Credit Account Transactions.

The Payment Processing System

Figure 4:
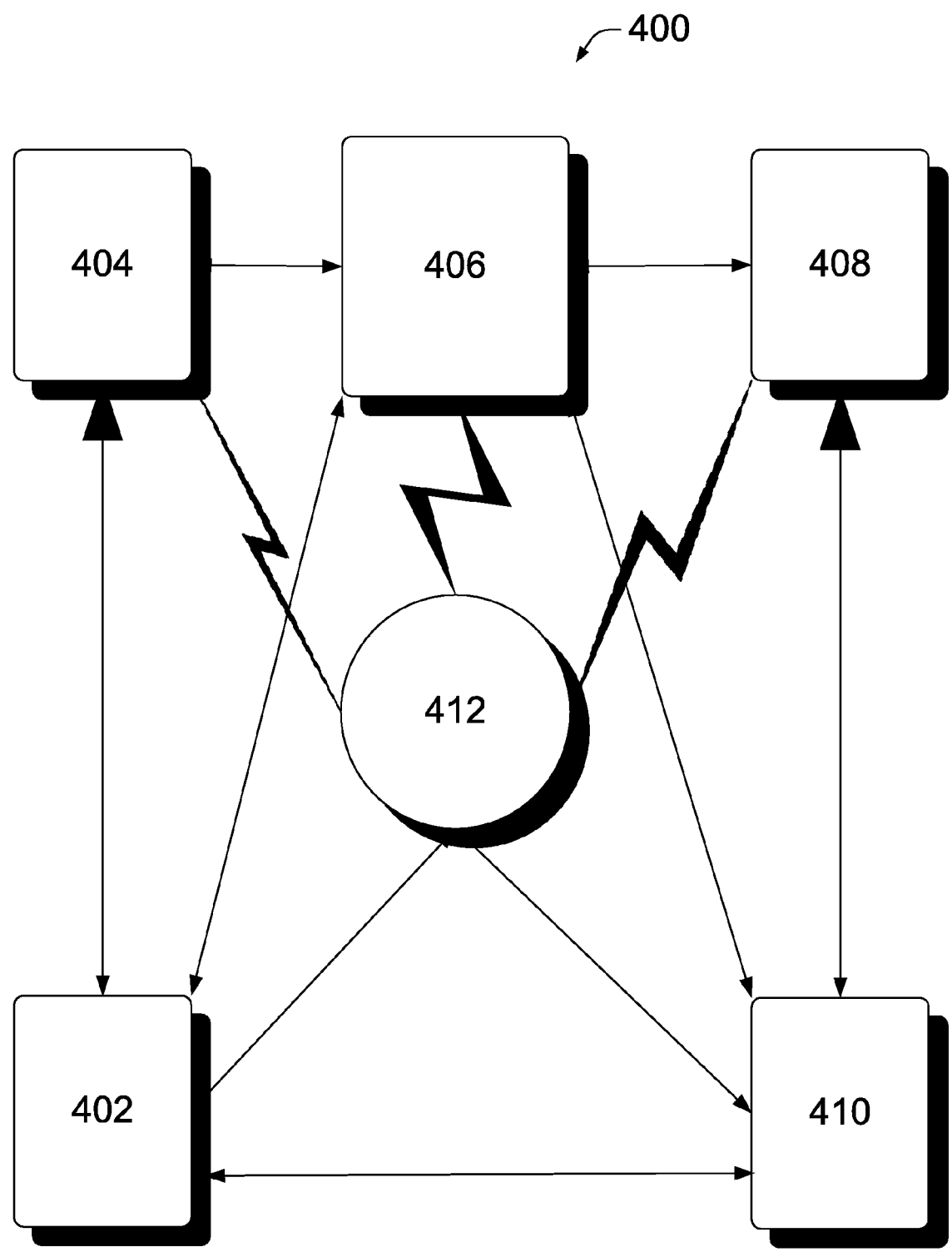
FIG. 4 illustrates a block diagram of an exemplary payment processing system within which the exemplary methods and processes of FIGS. 1-3 may be practiced.

FIG. 4 illustrates a block diagram of an exemplary payment processing system 400 within which the exemplary methods and process of FIGS. 1-3 may be practiced. As will be readily understood by persons of ordinary skill in payment processing systems, a transaction such as a payment transaction in a payment processing system can include participation from different entities that are each a component of the payment processing system. The exemplary payment processing system 400 includes an issuer 404 such as the issuer; a transaction handler 406, such as the transaction handler; an acquirer 408 such as the acquirer; a merchant 410 such as the merchant; and a consumer 402 such as the consenting consumer. The acquirer 408 and the issuer 404 can communicate through the transaction handler 406. The merchant 410, such as the utility provider, may utilize at least one POS that can communicate with the acquirer 408, the transaction handler 406, or the issuer 404. Thus, the POS is in operative communication with the payment processing system 400.

Typically, a transaction begins with the consumer 402 presenting an account number of an account (e.g., non-credit account) such as through the use of a computer terminal or a portable consumer device 412 to the merchant 410 to initiate an exchange for a good or service. The consumer 402 may be an individual or a corporate entity. The consumer 402 may be an account holder of the account issued by the issuer 404 such as a joint account holder of the account or a person having access to the account such as an employee of a corporate entity having access to a corporate account. The portable consumer device 412 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 412 may include a volatile or a non-volatile memory to store information such as the account number or a name of the account holder.

The merchant 410 may use an acceptance point device, such as a POS, to obtain account information, such as the indicator for the account (e.g., the account number of the account), from the portable consumer device 412. The portable consumer device 412 may interface with the POS using a mechanism including any suitable electrical, magnetic, or optical interfacing system such as a contactless system using radio frequency, a magnetic field recognition system, or a contact system such as a magnetic stripe reader. The POS sends a transaction authorization request to the issuer 404 of the portable consumer device 412. Alternatively, or in combination, the portable consumer device 412 may communicate with the issuer 404, the transaction handler 406, or the acquirer 408.

The issuer 404 may submit an authorize response for the transaction via the transaction handler 406. Authorization includes the issuer 404, or the transaction handler 406 on behalf of the issuer 404, authorizing the transaction in connection with instructions of the issuer 404, such as through the use of business rules. The transaction handler 406 may maintain a log or history of authorized transactions. Once approved, the merchant 410 can record the authorization and allow the consumer 402 to receive the good or service.

The merchant 410 may, at discrete periods, such as the end of the day, submit a list of authorized transactions to the acquirer 408 or other components of the payment processing system 400 for clearing and settling. The transaction handler 406 may compare the submitted authorized transaction list with its own log of authorized transactions. If a match is found, the transaction handler 406 may route the clearing and settling request from the corresponding acquirer 408 to the corresponding issuer 404 involved in each transaction. Once the acquirer 408 receives the payment of the transaction from the issuer 404, it can forward the payment to the merchant 410 less any transaction costs, such as fees. If the transaction involves a debit or pre-paid card, the acquirer 408 may choose not to wait for the initial payment prior to paying the merchant 410.

There may be intermittent steps in the foregoing process, some of which may occur simultaneously. For example, the acquirer 408 can initiate the clearing and settling process, which can result in payment to the acquirer 408 for the amount of the transaction. The acquirer 408 may request from the transaction handler 406 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A computer system using comprising:
software instructions and one or more processors to execute a credit rating computation algorithm to:
receive a plurality of cashless transactions on an non-credit account of a consumer, wherein each of said plurality of cashless transactions were
conducted by the consumer with a merchant for a purchase of a payment amount using a pre-paid reloadable card representing the non-credit account; and
derive, using a modified Fair Isaac Corporation (FICO) credit rating computation algorithm of the consumer as a function of non-credit transaction data from the plurality of cashless transactions on the non-credit account of the consumer.

2. The computer system as defined in claim 1, wherein the non-credit transaction data for the consumer is selected from the group consisting of a total of all of the payment amounts for all of the cashless transactions, the total of all of the payment amounts for all of the cashless transactions for each said merchant, the total of all of the payment amounts for all of the cashless transactions for each category of said merchants, and a combination of the foregoing.

3. The computer system as defined in claim 1, wherein:
each said cashless transaction comprises a Merchant Commodity Code (MCC) of the merchant; and
the non-credit transaction data, for the consumer, a total of all of the payment amounts for each said MCC.

4. The computer system as defined in claim 1, wherein:
each said non-credit account is issued by an issuer to the consumer; and
for each said cashless transaction on the non-credit account:
each said merchant submits the cashless transaction to an acquirer for processing by a transaction handler who requests the issuer to obtain the payment amount for the cashless transaction from the account; and
the issuer forwards the payment amount of the cashless transaction to the transaction handler who forwards the payment amount of the cashless transaction to the acquirer to pay the merchant for the cashless transaction.

5. The computer system as defined in claim 1, wherein the non-credit transaction data from the plurality of cashless transactions on the non-credit account of the consumer includes:
a date of each said cashless transaction for each said non-credit account;
the payment amount for each said cashless transaction; and
a summation selected from the group consisting of a total of all of the payment amounts for all of the cashless transactions for each said non-credit account, a total of all of the payment amounts for all of the cashless transactions for each said non-credit account for each said merchant, a total of all of the payment amounts for all of the cashless transactions for each said non-credit account for each catagory of said merchants, and a combination of the forgoing.

6. The computer system as defined in claim 5, wherein the non-credit transaction data from the plurality of cashless transactions on the non-credit account of the consumer further comprises:
the merchant for each said cashless transaction; and
a total of all of the payment amounts for each said merchant.

7. The computer system as defined in claim 5, wherein:
each said transaction includes a Merchant Commodity Code (MCC) of the merchant; and
the non-credit transaction data from the plurality of cashless transactions on the non-credit account of the consumer further comprises a total of all of the payment amounts for each said MCC.

8. The computer system as defined in claim 5, wherein:
each said non-credit account is issued by an issuer to the consumer; and
for each said cashless transaction for each said non-credit account:
each said merchant submits the cashless transaction to an acquirer for processing by a transaction handler who requests the issuer to obtain the payment amount for the cashless transaction from the non-credit account; and
the issuer forwards the payment amount of the cashless transaction to the transaction handler who forwards the payment amount of the transaction to the acquirer to pay the merchant for the purchase of the cashless transaction.

9. A apparatus comprising: software instructions and one or more processors to:
read a plurality of transactions and execute a modified Fair Isaac Corporation (FICO) credit rating computation algorithm to derive a credit rating for a consumer as a function of the plurality of transactions, wherein each said transaction is:
for a purchase by the consumer from a merchant;
upon an non-credit account issued by an issuer to the consumer, the non-credit account having sufficient funds for the purchase at the time of the corresponding said transaction; and
communicated by the merchant to an acquirer for processing by a transaction handler who requests the issuer to obtain from the non-credit account a payment amount for the purchase of the transaction, wherein the issuer forwards the payment amount of the transaction for delivery to the acquirer to pay the merchant for the purchase of the transaction.

10. The apparatus as defined in claim 9, wherein the credit rating for the consumer is further derived from a total of all of the payment amounts.

11. The apparatus as defined in claim 9, wherein the credit rating for the consumer is further derived from a total of all of the payment amounts to each said merchant.

12. The apparatus as defined in claim 9, wherein:
each transaction includes a Merchant Commodity Code (MCC) of the merchant of each said transaction; and
the credit rating for the consumer is further derived from a total of all of the payment amounts for each said MCC.

13. A computer implemented method comprising:
a plurality of steps each being performed by a computing apparatus executing credit rating computational software instructions, wherein the steps include:
receiving, for each of a plurality of consumers, a total of all payment amounts amounts for all corresponding transactions, wherein each said transaction:
takes place in a payment processing system that processes a plurality of said transactions; and
is characterized by a merchant and one said consumer engaging in the transaction for a purchase upon non-credit account, wherein:

the consume offers to the merchant a payment amount for the transaction using a portable consumer transaction card tha corresponds to the account in which the payment amount is on deposit at the time of the transaction; and each said consumer has one or more of said portable consumer transaction cards; and deriving, using a modified Fair Isaac Corporation (FICO) credit rating computation algorithm, for each said consumer, a credit rating at least in part from the received total.

14. The computer implemented method as defined in claim 13, wherein the received total for each said consumer comprises data corresponding to one or more said non-credit accounts of the consumer, each said non-credit account having at least one said transaction with the date thereof within a predetermined time period.

15. The computer implemented method as defined in claim 13, wherein the receiving, for each said consumer, further comprises a total of all of the payment amounts for all of the transactions for each said merchant.

16. The computer implemented method as defined in claim 13, wherein:
each said transaction comprises a Merchant Commodity Code (MCC) of the merchant; and
the receiving, for each said consumer, further comprises receiving a total of all of the payment amounts for each said MCC.

17. The computer implemented method as defined in claim 13, wherein:
each said non-credit account is issued by an issuer to the consumer; and
for each said transaction for each said non-credit account of each said portable consumer transaction card:
each said merchant submits the transaction to an acquirer for processing by a transaction handler who requests the issuer to obtain the payment amount for the transaction from the non-credit account; and
the issuer forwards the payment amount of the transaction to the transaction handler who forwards the payment amount of the transaction to the acquirer to pay the merchant for the purchase of the transaction.

18. The computer implemented method as defined in claim 13, wherein:
each said non-credit account is issued by an issuer to the consumer;
for each said transaction, the merchant submits the transaction to an aquirer for processing by a transaction handler who requests the issuer to obtain the payment amount for the transaction from the non-credit account, and wherein the issuer forwards the payment amount of the transaction to the transaction handler who forwards the payment amount of the transaction to the acquirer to pay the merchant for the purchase of the transaction
the steps including further comprise:
receiving data from a database, the data for each said consumer having one or more said pre-paid portable consumer transaction cards including:
a date of each said transaction;
the merchant of each said transaction;
a Merchant Commodity Code (MCC) of the merchant of each said transaction;
the payment amount for each said transaction; and
a total of all of the payment amounts for all of the transactions for:
each said merchant of each said transaction upon each said non-credit account; and
each said MCC of each said merchant of each said transaction upon each said non-credit account;
and
using the data from the database for the deriving, using the credit rating computation algorithm, for each said consumer, of the credit rating in part from the received total, wherein the data from the database used to derive the credit rating corresponds to one or more said non-credit accounts of the consumer, each said non-credit account having at least one said transaction with the date thereof within a predetermined time period.

19. The computer implemented method as defined in claim 18, wherein the steps further comprise receiving a request from one said consumer that the data corresponding to the one or more said non-credit accounts of the one said consumer is to be used to derive the credit rating, and wherein the receiving of the data from the database for the one said consumer is performed after the receipt of the request from the one said consumer.

20. A credit rating adjustment method comprising:
a plurality of steps each being performed using a computing apparatus executing credit rating computational software instructions, wherein the steps include:
receiving at least one credit rating value associated with a borrower, said at least one credit rating value being generated by at least one credit reporting bureau;
receiving additional data that was:
not considered by said at least one credit reporting bureau; and
derived from a plurality of transactions each characterized by a merchant and the borrower engaging in the transaction for a purchase upon a non-credit account, the borrower offering to the merchant a payment amount for the transaction using a portable consumer transaction card that corresponds to the non-credit account, the non-credit account having the payment amount therein at the time of the transaction, and wherein the borrower has one or more said pre-paid portable consumer transaction cards, wherein the additional data includes a total of all of the payment amounts for all of the transactions conducted by the borrower with the one or more said portable consumer transaction cards; and deriving, using a modified Fair Isaac Corporation (FICO) algorithm, a revised credit rating value for the borrower from said at least one credit rating value and said additional data.

21. The credit rating adjustment method as defined in claim 20, wherein:
the additional data comprises data corresponding to one or more said non-credit accounts of the borrower; and
each said non-credit account has at least one said transaction with the date thereof within a predetermined time period.

22. The credit rating adjustment method as defined in claim 20, wherein the additional data further comprises, for the borrower, a total of all of the payment amounts for all of the transactions for each said merchant.

23. The credit rating adjustment method as defined in claim 20, wherein:
each said transaction comprises a Merchant Commodity Code (MCC) of the merchant; and
the additional data further comprises, for the borrower, a total of all of the payment amounts for each said MCC.

24. The credit rating adjustment method as defined in claim 20, wherein:

each said non-credit account is issued by an issuer to the borrower; and for each said transaction for each said non-credit account of each said portable consumer transaction card:

each said merchant submits the transaction to an acquirer for processing by a transaction handler who requests the issuer to obtain the payment amount for the transaction from the non-credit account; and the issuer forwards the payment amount of the transaction to the transaction handler who forwards the payment amount of the transaction to the acquirer to pay the merchant for the purchase of the transaction.

25. The credit rating adjustment method as defined in claim 20, wherein the portable consumer transaction card is selected from the group consisting of a non-credit account card, a prepaid card, a prepaid reloadable card, a debit account, a deposit account card, a flexible spending account card, a health savings account card, and combinations of the foregoing.

26. A non-transitory program product, comprising a computer readable medium having a computer readable program code embodied therein, said computer readable program code adapted to be executed to implement the steps of the method of claim 13.

27. A non-transitory program product, comprising a computer readable medium having a computer readable program code embodied therein, said computer readable program code adapted to be executed to implement the steps of the method of claim 20.

* * * * *